United States Patent Office 3,495,929
Patented Feb. 17, 1970

3,495,929
METHOD FOR IMPROVING THE FASTNESS TO GAS FADING OF DYED MATERIAL
Alois Kleemann, Basel, Switzerland, assignor to Geigy Chemical Corporation, Greenburgh, N.Y., a corporation of Delaware
No Drawing. Filed Nov. 23, 1966, Ser. No. 596,446
Claims priority, application Switzerland, Dec. 1, 1965, 16,576/65
Int. Cl. D06p 3/34
U.S. Cl. 8—165        5 Claims

ABSTRACT OF THE DISCLOSURE

The fastness to gas fading of dyed cellulose ester and polyurethane material and elastomeric polyurethanes is improved by incorporating in such materials from 0.5–5% of a water-soluble piperazine of the formula:

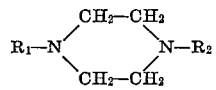

wherein $R_1$ and $R_2$ are as defined in the specification.

THE INVENTION

The present invention concerns a method for improving the fasteness to gas fading of dyeings and plastics which are sensitive thereto and also, as industrial product, the dyeings and plastics which are improved by this process, as well as compositions containing compounds which inhibit gas fading and the compounds themselves.

The wash-fast finishing of dyeings and plastics which are sensitive to gas fading has been attained hitherto by treatment of the dyeings or plastics with compounds which make them fasta to gas fading, which compounds are difficultly soluble in water. The material to be protected from gas fading was generally treated with aqueous dispersions and emulsions of these active substances. The production of aqueous dispersions and emulsions which are stable under the application conditions is complicated and the use of such impregnating liquors is bound up with considerable difficulties in many cases. It has been very much desired to use fast, aqueous solutions of auxiliaries which promote fasteness to gas fading such as triethanolamine, but hitherto this has been impossible due to the lack of fastness to water and washing of the finishings attained therewith.

Surprisingly however, it has now been found that dyeings and plastics which are sensitive to gas fading can be given a wash-fast finish against injury by gas treating them with a water soluble piperazine of the formula

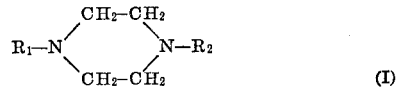  (I)

wherein $R_1$ represents cycloalkyl, an aliphatic group with 6 to 18 carbon atoms, or a mononuclear aryl or aralkyl group the ring of which may be substituted by non-coloring and non-ionogenic substituents,
$R_2$ represents hydrogen, a lower alkyl group, which may be substituted by mono- or polyhydroxy, alkoxy, cyano, lower alkylamino or dialkylamino; or a mono- or polyamino, hydroxy, amino, dialkylamino, lower alkylamino.

Cycloalkyl groups in the position of $R_1$ can contain 3- to 6-membered rings; preferably $R_1$ is the cyclohexyl group. As mononuclear aralkyl groups, the α- or β-phenylethyl group and, above all the benzyl group can be mentioned which can be ring substituted by non-coloring and non-ionogenic substituents, e.g. by halogen, lower alkyl, alkylthio and alkoxy groups; preferred is methyl.

Representatives for an aliphatic group with 6 to 18 carbon atoms are saturated and unsaturated hydrocarbons like, for instance, lauryl, stearyl, oleyl, hexyl, heptyl, octyl, nonyl, decyl, undecyl.

Preferably $R_1$ as aryl group represents the phenyl group. Examples of non-coloring and non-ionogenic substituents thereof are halogen, lower alkyl, lower alkoxy, and lower alkylthio groups.

Unsubstituted alkyl groups in the position of $R_2$ preferably contain 1 to 2 carbon atoms; substituted alkyl groups preferably contain two carbon atoms. Examples of substituted lower alkyl groups are the β-hydroxyethyl, γ-hydroxypropyl, β,γ-dihydroxypropyl, β-methoxyethyl, β-ethoxyethyl, γ-methoxypropyl, γ-ethoxypropyl, β,γ-dimethoxypropyl, β,γ-diethoxypropyl, cyanoethyl, β-aminoethyl, β-dimethylaminoethyl or β-diethylaminoethyl, dioxethylaminoethyl, β- or γ-aminopropyl, dimethylaminopropyl or diethylaminopropyl group. Preferably however, $R_2$ is hydrogen.

The term "lower alkyl" when used in combination with other terms means alkyl groups with up to 4 carbon atoms.

Some of the piperazines of the above formula which are usable according to the invention are known or can be prepared in the known way.

Dyeings which are sensitive to gas fading, particularly cellulose ester, or polyurethane dyeings, are preferably treated with an aqueous solution of the piperazines of. Formula I. This fibre material can be pre-treated with the piperazine solution and then dyed, or the piperazines mentioned can be added to the dyebath and dyeing and making fast to gas fading can be performed in one step or, finally, the dyed fibre material can be subsequently treated with the piperazine solution.

It is also possible to incorporate the piperazines of Formula I into the spinning masses.

To protect elastomeric polyurethanes which are sensitive to gas fading from injury due to industrial fumes, particularly to reduce the yellowing of Spandex fibers (long chain synthetic polymer containing at least 85% of a segmented polyurethane), these plastics are treated with an aqueous or organic solution of the piperazines as defined.

Dyeings on cellulose esters and polyurethanes, which have been treated piperazines of Formula I to be used according to the invention are more resistant to the effect of industrial fumes, that is nitrous oxides, than untreated dyeings. Also, elastomeric polyurethanes treated with these piperazines are substantially more protected against yellowing due to industrial fumes.

The anti-gas fading finishes obtained by the process according to the invention withstand repeated washing with usual washing agents.

The piperazines of Formula I usable according to the invention have hardly any injurious effect on the fastness to light of the dyeings on the materials mentioned which have been treated therewith.

Carrier material for the preparation of compositions containing compounds of Formula I is preferably water. However, additives may be added in small amounts, like wetting agents, for instance non-ionogenic polyglycolether; emulsifiers and/or other additives.

In order to attain a satisfactory degree of gas fading inhibition in the dyeings and plastics to be protected, it is necessary to apply or incorporate therein from about 0.5 to 5% and preferably from about 0.75 to 2.0% of a gas fading inhibiting compound of Formula I.

The following examples illustrate the invention. The temperatures are given therein in degrees Centigrade.

C.I. means Colour Index, published by the Society of Dyers and Colourists, Dean House, Piccadilly, Bradford, Yorkshire, England, with acknowledgement to the American Association of Textile Chemists and Colorists, Lowell, Mass., U.S.A.

EXAMPLE 1

A cellulose acetate fabric is pretreated for 30 minutes at 40° with 40 times the amount of an aqueous solution which contains 1% (calculated on the weight of the goods) of active substance of the formula

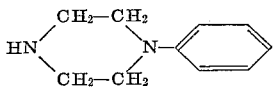

An aqueous dispersion of 0.2% of dyestuff Disperse Blue 3 (61505) of the Colour Index is added to this solution. The treatment bath is then heated from 40° to 80° within 30 minutes, and kept for another 45 minutes at this temperature. The sample is then rinsed in cold water and dried.

As a comparison, another sample of the same cellulose acetate fabric is dyed in the same manner as described above with the same dyestuff but without the active substance.

The dyed samples are placed in a container together with a test fabric (Gas fading control sample No. 1 of Test Fabrics Inc., 55 Vandam St., New York 13, N.Y.) and, while excluding light, are exposed to the combustion gases of a coal gas flame at 40–45° (according to American Standard Method L 14–54–1951) until the test fabric has changed from blue to pink.

On exposure to combustion fumes, the fabric treated with active substance of the above formula shows practically no change in shade whereas the comparative sample has changed very strongly from blue to red.

Similar results are obtained with otherwise the same procedure if, in the above example, one of the active substances given in the following table is used.

ACTIVE SUBSTANCES

General Formula: 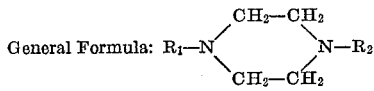

| Number | $R_1$ | $R_2$ | Prepared according to— |
|---|---|---|---|
| (a) | –C₆H₄–CH₃ | H | C.A. 28, 5825 (1934). |
| (b) | –C₆H₄–C₂H₅ | H | C.A. 28, 5825 (1934). |
| (c) | –C₆H₄–O–CH₃ | H | C.A. 53, 16144$^d$ (1959). C.A. 42, 1942$^{b,c,d}$ (1948). C.A. 28, 5825$^{1,2}$ (1934). |
| (d) | –C₆H₄–S–CH₃ | H | C.A. 53, 16144$^d$ (1959). C.A. 42, 1942$^{b,c,d}$ (1948). C.A. 28, 5825$^{1,2}$ (1934). |
| (e) | –C₆H₄(OC₂H₅) | H | C.A. 53, 16144$^d$ (1959). |
| (f) | –C₆H₄(Cl) | H | C.A. 28, 5825 (1934). |
| (g) | –C₆H₄(Br) | H | C.A. 28, 5825 (1934). |
| (h) | –CH(CH₂–CH₂)(CH₂–CH₂) (cyclohexyl) | H | C.A. 52, 12874$^g$ (1958). C.A. 54, 12169$^g$ (1960). |
| (i) | –CH₂–C₆H₅ | H | C.A. 58, 10045$^e$ (1963). O.S. 42, 19. C.E. 59, 11530$^e$ (1963). |
| (k) | –C₆H₅ | CH₃– | C.A. 29, 7986$^3$ (1935). |
| (l) | –C₆H₅ | C₂H₅– | C.A. 29, 7986$^3$ (1935). |
| (m) | –C₆H₅ | HO–CH₂CH₂– | C.A. 58, 11358$^g$ (1963). |
| (n) | –C₆H₅ | C₂H₅–O–CH₂CH₂– | C.A. 32, 5832$^5$ (1938). |
| (o) | –C₆H₅ | H₂N–CH₂CH₂– | C.A. 42, 1941$^i$ (1948). |
| (p) | –C₆H₅ | (CH₃)₂N–CH₂CH₂– | C.A. 42, 1940$^b$, 3395$^i$ (1948). |

| Number | R₁ | R₂ | Prepared according to— |
|---|---|---|---|
| (q) | -⟨phenyl⟩- | HO—CH₂—CH₂\ N—CH₂CH₂—  /HO—CH₂CH₂ | C.A. 42, 1940ᶠ (1948). |
| (r) | -⟨phenyl⟩- | ⟨piperidinyl with H, N⟩—CH₂—CH₂— | C.A. 42, 1940ᶠ (1948). |
| (s) | -⟨phenyl⟩- | ⟨morpholinyl O, N⟩—CH₂—CH₂— | C.A. 42, 1940ᶠ (1948). |
| (t) | -⟨phenyl⟩- | NC—CH₂CH₂— | C.A. 57, 3444ᵇ (1962). |
| (u) | -⟨phenyl⟩- | CH₂—CH—CH₂—  \| \|  OH OH | C.A. 56, 2460ᵈ (1962). |
| (v) | -⟨phenyl⟩- | H₂N— | C.A. 49, 4730ʰ,ⁱ (1955). |
| (w) | -⟨phenyl⟩- | HO— |  |
| (x) | n-C₆H₁₃— | H |  |
| (y) | n-C₁₂H₂₅— | H | {C.A. 41, 3133ᵈ. A.P. 2415787.} |
| (z) | C₁₈H₃₅— | H |  |
| (z¹) | C₁₈H₃₇— | H |  |

EXAMPLE 1a

N-phenyl-N'-hydroxy piperazine 33 g. of N-phenylpiperazine were dissolved in 50 ml. of water and 36 g. hydrogen peroxide (28%) were added drop by drop at room temperature while stirring. An oil was evolved which solidified during the day. The residue was filtered off and recrystallized from n-hexane. N-phenyl-N'-hydroxy piperazine was obtained which had a melting point of 142° C.

EXAMPLE 2

A sample of cellulose acetate fabric treated and dyed as described in Example 1 paragraph 1 is washed, before exposure to fumes, for 30 minutes at 50° in an aqueous solution which contains per litre, 0.5 g. of lauryl alcohol sulphate and 2 g. of sodium tripolyphosphate. The sample is then rinsed with cold water and dried.

The washed sample is then exposed to combustion gases as described in Example 1 paragraphs 2 and 3. Surprisingly, no change in shade can be seen after exposure, i.e. the water soluble active substance is not washed out of the fibres by the washing described above.

Similar results are obtained when cyclohexyl piperazine, 1-phenyl-4-hydroxyethyl piperazine, 1-phenyl-4-aminopropyl piperazine or stearyl piperazine are used with otherwise the same conditions.

EXAMPLE 3

Spandex fiber is impregnated at 20° with a 1% aqueous solution of the active substance of the formula

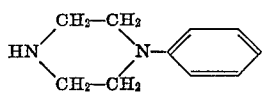

The fiber is centrifuged to 100% by weight and dried at 50–60°.

If this yarn is tested in the gas fading test according to Standard Leflet Din=54025 (testing with dilute nitrous gases), then it turns noticeably less yellow than untreated Spandex yarn.

EXAMPLE 4

Spandex fiber is impregnated at 20° with a 1% aqueous solution of the active substance of the formula

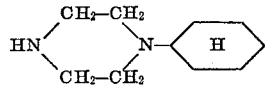

The fiber is centrifuged to 100% by weight and dried at 50 to 60°.

If this yarn is tested in the gas fading test according to Standard Leaflet Din=54025 (testing with dilute nitrous gases), then it turns noticeably less yellow than untreated Spandex yarn.

EXAMPLE 5

A solution of 15 g. of cellulose acetate, 0.15 g. of phenylpiperazine and 0.03 g. of 1-phenylamino-4-aminoanthraquinone in 100 ml. of acetone is drawn into films of about 0.2 mm. thickness.

As a comparison, corresponding films are produced not containing the active substance. Samples of these films, together with an untreated test fabric (gas fading control sample No. 1) are exposed to the combustion gases of a coal gas flame under the same conditions as described in Example 1.

After exposure, the film containing active substance shows no chage in shade whereas the comparative sample not containing this substance shows a very strong change from blue to pink.

Similar results are attained when cyclohexyl piperazine, 1-phenyl-4-hydroxyethyl piperazine, 1-phenyl-4-aminopropyl piperazine or stearyl piperazine are used with otherwise the same procedure as described.

I claim:

1. A process for improving the fastness to gas fading of material sensitive thereto selected from dyed cellulose ester, polyurethane fibers and elastomeric polyurethanes, which comprises treating said material with an aqueous solution of a water soluble piperazine of the formula:

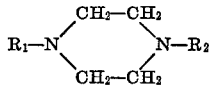

wherein

R₁ is cycloalkyl, an aliphatic group of 6 to 18 carbon atoms, of mononuclear aryl or aralkyl group, the ring of which may be substituted by lower alkyl, lower alkoxy, or lower alkylthio, and $R_2$ is hydrogen, amino lower alkyl, hydroxy lower alkyl, lower alkoxy lower alkyl, lower alkylamino lower alkyl, or dialkylamino lower alkyl, and drying, whereby said material contains from 0.5 to 5% by weight of said piperazine.

2. A process as claimed in claim 1 wherein the material treated is dyed cellulose ester or dyed polyurethane.

3. A process as claimed in claim 1 wherein the material treated is elastomeric polyurethane which is sensitive to gas fading.

4. A dyed fiber material selected from the group consisting of cellulose ester and polyurethane material, having improved fastness to gas fading which contains from 0.5 to 5% of a piperazine as defined in claim 1.

5. Elastomeric polyurethane containing from 0.5 to 5% of a piperazine as defined in claim 1.

References Cited

UNITED STATES PATENTS

| 2,415,786 | 2/1947  | Buck et al.     | 260—268  |
| 2,529,935 | 11/1950 | Gummel et al.   | 8—61     |
| 3,361,703 | 1/1968  | Childers        | 260—45.8 |
| 2,813,774 | 11/1957 | Schuster et al. | 8—61     |
| 3,376,264 | 4/1968  | Wieden          | 8—55     |

FOREIGN PATENTS

| 721,417 | 1/1955 | Great Britain. |

NORMAN G. TORCHIN, Primary Examiner

J. E. CALLAGHAN, Assistant Examiner

U.S. Cl. X.R.

8—61